United States Patent Office 3,468,980
Patented Sept. 23, 1969

3,468,980
FLAME RESISTANT ACRYLIC SHEET CONTAINING CYCLOHEXYL ACRYLATE OR METHACRYLATE COPOLYMER
George E. Forsyth, Trevose, Pa., assignor to Rohm & Haas Company, Philadelphia, Pa., a corporation of Delaware
No Drawing. Filed Jan. 17, 1966, Ser. No. 520,900
Int. Cl. C08f 37/16; C09k 3/28
U.S. Cl. 260—901                        6 Claims

ABSTRACT OF THE DISCLOSURE

Acrylic sheet composed of methylmethacrylate, a flame retarding polymeric phosphorous compound, and cyclohexyl acrylate or methacrylate is claimed. The acrylic sheet offers improved flame resistance, water absorption, outdoor exposure stability, higher heat distortion temperature, better forming characteristics and other properties.

---

This invention deals with stable acrylic sheet. It more particularly deals with acrylic sheet that has superior flame-resistant properties. It also deals with acrylic sheet that possesses superior qualities in reduced water absorption. Additionally, it deals with acrylic sheet that exhibits enhanced outdoor exposure stability in a wide range of different climates. It also deals with acrylic sheet that has a high heat distortion temperature. It deals with acrylic sheet that has superior structural strength and marked dimensional stability. It also deals with acrylic sheet that can be formed and processed with ease of operation. It most particularly deals with acrylic sheet of sparkling clarity that possesses concurrently all of the above-delineated valuable properties.

The acrylic sheet of the present invention is composed of at least 50% methyl methacrylate, 5–30% cyclohexyl methacrylate or cyclohexyl acrylate, preferably 10–30%, and most particularly 12–18%, cyclohexyl methacrylate being preferred, and 5–25% of a flame-resistant polymeric phosphorus compound, preferably 10–15%, and most particularly 12–13%.

While it is preferred in most instances to adhere rigidly to the minimal requirement of 50% for methyl methacrylate, there may be, in some instances, substituted up to 5% of a modifying acrylic compound, such as ethyl acrylate, methacrylic acid, glycidyl methacrylate and the like, when special properties are desired. This variation is included within the gamut of this invention.

A preferred embodiment of the invention is an article of manufacture as an acrylic sheet comprising 85 to 95% by weight of the polymerization product of 50 to 95% methyl methacrylate, 5 to 30% cyclohexyl acrylate, cyclohexyl methacrylate or a mixture of both, and 0 to 5% of a modifying acrylic compound as described above and obtained by polymerization with or in admixture with 5 to 15% of a flame-resistant polymeric phosphorus compound.

The cyclohexyl methacrylate must be employed in the ranges previously disclosed and connot be substituted within the purposes of this invention. One needs to adhere strictly to the identity and amounts of the cyclohexyl methacrylate or cyclohexyl acrylate in order to realize the valuable concurrence of properties listed heretofore.

The flame-resistant polymeric phosphorus compound may be any of several possible types. It may be represented by a single compound or by a mixture of compounds, as desired. These phosphorus compounds may be phosphites, phosphates or phosphonates or mixtures thereof. They may also contain halogen, such as chlorine or bromine. Other substituents that may be present include cyano, nitro, ether, ester, amide or other groups, the important thing being that they are polymeric phosphorous-containing compounds of known flame-resistant qualities when incorporated into plastic masses. The definition of these polymeric phosphorus compounds can be more fully understood by reference to United States Patents Nos. 3,014,944, 3,014,951, 3,014,954, 3,014,956, 3,020,306, 3,058,941 and 3,161,607.

A particularly useful polymeric flame-retardant phosphonate polymer is defined in application Ser. No. 343,223, filed Feb. 7, 1964 now U.S. Patent No. 3,371,131. This addition phosphonate polymer may be characterized by the following repeating unit:

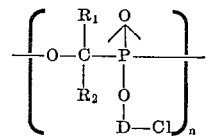

$R_1$ and $R_2$ each contains up to 12 carbon atoms and represent alkyl, phenyl, phenylalkyl, alkylphenyl, alkenyl and alkoxycarbonyl. $R_1$ and $R_2$, taken collectively with the carbon atom to which they are attached, form an aliphatic ring of 5 to 7 carbon atoms. This aliphatic ring may be saturated or monounsaturaed. It is preferred that the total number of carbon atoms in $R_1$ plus $R_2$ be no greater than 17. It is also preferred that at least one of $R_1$ and $R_2$ represents alkyl.

The alkylphenyl embodiment of $R_1$ and $R_2$ may consist of one or more alkyl substituents on the phenyl ring, as desired, as long as the total carbon content is observed. Furthermore, when a phenyl ring is employed in $R_1$ or $R_2$, it may contain inert substituents, such as chlorine and the like. Such is within the scope of this invention.

D represents an alkylene group of 2 to 3 carbon atoms or the alkyl-substituted alkylene group wherein the alkylene portion contains 2 to 3 carbon atoms and the alkyl substituents total up to 8 carbon atoms.

The symbol $n$ is an integer of 2 to at least 10,000 and preferably of such a value that the molecular weight of the polymer is at least 800 and particularly 800 to about 100,000. The product is useful as a flame-retardant and flame-proofing agent for various polymer systems. Generally, polymers of this invention having molecular weights of at least about 5,000 and up to 65,000 and above are, in addition, useful as flame-retardant and flame-proof products themselves.

The present addition phosphonate polymers are prepared by reacting, in a range of about −70° to 100° C., preferably −20° to 60° C., two components, an enolizable ketone with a cyclic chlorophosphite. The enolizable ketone reactant may be represented by the formula

wherein $R_2$ has the structure,

and $R_1$ and $R_2$ have the significance discussed hereinbefore, although actually any ketone that will enolize will perform satisfactorily in the process of the present invention.

Addition polymers are referred to in this application in harmony with the definition given in Principles of Polymer Chemistry by Paul J. Flory, p. 37 et seq., 1953.

Typically, the ketone reactants include acetone, butanone, hexanone, heptanone, octanone, dodecanone, octadecanone, cyclopentanone, cyclohexanone, cycloheptanone, acetophenone, acetochlorophenone, phenylpropanone, chlorophenylpentanone, phenylpentanone, diphenylhexanone, phenyloctanone, phenyldodecanone, pentenone, hexenone, dodecenone, cyclopentenone, cyclohexenone, propenylpropanone, butenylpropanone, hexenylhexanone, octenylbutanone, methoxycarbonyl propanone, ethoxycarbonyl propanone, methoxycarbonyl butanone, butoxycarbonylbutanone, hexoxycarbonyl pentanone, octoxycarbonyl octanone, methoxycarbonyl pentenanone, pentoxycarbonyl octenone and octoxycarbonyl heptenone. These ketones can be used in any of their isomeric forms as long as they conform to the enolizable structure presented hereinbefore. Generally, only one ketone will be used in any one reaction but it is possible to employ mixtures of ketones, if desired. Such mixtures are within the gamut of this invention.

The chlorophosphite reactant may be represented by the formula

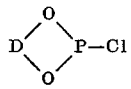

wherein D has the significance previously set forth. Typical embodiments of the halophosphite reactant include ethylene chlorophosphite, propylene chlorophosphite, trimethylene chlorophosphite, dimethylethylene chlorophosphite, propylethylene chlorophosphite, dibutylethylene chlorophosphite, dimethylpropylene chlorophosphite, butylpropylene chlorophosphite, butyltrimethylene chlorophosphite, diethyltrimethylene chlorophosphite, dibutylethylene chlorophosphite, dimethylpropylene chlorophosphite and butyltrimethylene chlorophosphite.

Generally, the chlorophosphite will be used as such, but in many instances it is desirable to prepare the chlorophosphite in situ by the reaction of the suitable glycol with phosphorus trichloride. The ketone is then added thereto. It is possible to incorporate bromine into the polymer, if desired, by using initially a chlorophosphite and then introducing hydrogen bromide into the reaction medium.

The above-described reaction may be conducted without a solvent, but there may be used an inert, volatile, organic solvent in order to expedite the reaction and provide a medium in which the stability of the product is not adversely affected. Typical solvents include esters, such as methyl methacrylate and ethyl acetate; chlorinated aliphatic compounds, such as methylene chloride and ethylene chloride; and aromatic hydrocarbons, such as xylene, benzene and toluene.

The above reaction is conducted in an acid medium which is created by the addition of an acid itself or a compound that generates acid from the chlorophosphite reactant. These include water, methanol, ethanol, hydrochloric acid, sulfuric acid, or Lewis acids, such as boron trifluoride and the like.

The addition phosphonate polymer is substantially transparent and ranges from colorless to straw-yellow liquids to glassy solids. Particularly useful are those that are thermally stable, at least up to about 140° C. The solution of the addition phosphonate polymer may be incorporated into the methyl methacrylate polymer system and the system stripped to remove solvent and unused reactants. This leaves the addition phosphonate polymer intimately incorporated in the desired polymer system which will then ultimately yield structural acrylic sheet of outstanding properties.

The solution of addition phosphonate polymer may also be incorporated into the methyl methacrylate system or into a syrup consisting of a partially polymerized monomer or consisting of a solution of polymer and monomer and the system stripped to remove solvent. The resulting mixture may then be converted by conventional methods to the acrylic sheet of this invention. Other methods of incorporating the addition phosphonate polymer into the methyl methacrylate system will be apparent to those skilled in the art, such as by dry blending, hot melting and others.

Preferred embodiments of the above-described addition phosphonate polymer are those where $R_1$ and $R_2$ represent alkyl, D represents an alkylene chain of 2 to 3 carbon atoms and the molecular weight of the phosphonate polymer is at least 800, up to about 65,000.

Other preferred flame-resistant and retardant polymeric phosphorus compounds are those containing halogens, especially chlorine or bromine or both.

While various modifications of acrylic sheet have been tried with the idea of developing superior characteristics with respect to the many properties disclosed hereinbefore, it is common experience that when some properties are improved, others are adversely affected. It is a particular distinction of the present invention that superior performances are observed concurrently in the aforementioned categories.

The properties of the present stable acrylic sheet were evaluated by standard methods, such as the various ASTM procedures and the like. The flame-resistant and flame-retardant properties were evaluated according to ASTM Procedure D635–56 T. For acrylic sheet to be broadly commercially acceptable, it should be characterized as non-burning or self-extinguishing, that is, it should not burn at all or if it starts to burn, it should extinguish itself within a defined distance. This self-extinguishing characteristic is usually measured in inches per minute and values such as $\frac{1}{10}$ to $\frac{2}{10}$ are consistently achieved.

The water-absorption property was evaluated according to ASTM Procedure D570–59 T. Periods of evaluation of seven days in a room temperature water bath and twenty-one hours in a 60° C. water bath consistently gave values of below 1.50% by weight of water absorbed. Frequently, values of less than 1.25% by weight of water absorbed were obtained. The preferred embodiments and ranges of components previously defined frequently lead to water absorption values of 1% and below.

The heat distortion evaluations were made using ASTM Procedure D6408–56. Values in this respect were consistently obtained above 90° C. and frequently above 100° C.

The acrylic sheet of this invention exhibits substantial stability toward outdoor climatic conditions over prolonged periods of time. Essentially no change in color and clarity were observed in periods of time well over one year. These exposure evaluations were made according to standard Fade-Ometer and weatherometer procedures.

The ease of manufacturing was consistently observed in that as the sheet material is prepared, according to standard techniques, it is readily removed from the molds without distortion or cracking. There was no evidence of sticking to molds and, therefore, the sheet could be consistently produced under normal operating conditions. The acrylic sheet exhibited satisfactory structural strength and could be formed into various configurations at normal operation conditions. For instance, the acrylic sheet of this invention can be vacuum formed easily, at low forming temperatures of 150° C., or lower, so as to fill even small mold cavities of about 8 centimeters in diameter and 4 centimeters deep.

The surprising and considerably advantageous result of the acrylic sheet of this invention is that it possesses all of the above-desired qualities at the same time and exhibits remarkable stability through prolonged periods of use.

The acrylic sheet is prepared and fabricated according to known techniques. No special treatment is necessary. The only requirement is rigid adherence to the components and amounts, previously described, it one is to obtain all of the valuable results of this invention.

The present invention may be more fully understood from the following illustrative examples. Parts by weight are used throughout.

Example 1

(A) To methyl methacrylate monomer was added 0.03% of a 25% solution of acetyl peroxide in dimethyl phthalate.

Portions of (A) were blended with the following materials:

(B) 87.5 parts of (A) was mixed with 12.5 parts of a commercially available flame retarder, Phosgard C–22–R, a phosphonate polymer containing chlorine and manufactured by Monsanto Chemical Co.

(C) 72.5 parts of (A) was mixed with 12.5 parts of Phosgard C–22–R and 15.0 parts of cyclohexyl methacrylate monomer.

(D) 57.5 parts of (A) was mixed with 12.5 parts of Phosgard C–22–R and 30.0 parts of cyclohexyl methacrylate monomer.

(E) 87.5 parts of (A) was mixed with 12.5 parts of Phosgard 442. Phosgard 442 is a phosphonate polymer containing chlorine and bromine and manufactured by the Monsanto Chemical Co.

(F) 72.5 parts of (A) was mixed with 12.5 parts of Phosgard 442 and 15.0 parts of cyclohexyl methacrylate monomer.

(G) 57.5 parts of (A) was mixed with 12.5 parts of Phosgard 442 and 30.0 parts of cyclohexyl methacrylate monomer.

(H) 82.5 parts of (A) was mixed with 12.5 parts of poly(isopropylidene β-chloroethyl phosphonate) having a molecular weight of about 15,000 and 5.0 parts of methacrylic acid. The poly(isopropylidene β-chloroethyl phosphonate) had been previously prepared in the following manner:

A solution of 1487 parts of ethylene chlorophosphite in 2000 parts of methylene dichloride was charged to a 5-liter flask equipped with a stirrer, thermometer, reflux condenser and provision for maintenance of a nitrogen atmosphere in the flask. Over a 1-hour period, there was gradually added to this solution a total of 852 parts of acetone to which had been added 2 parts of water. A moderate exotherm was observed for a 3-hour period following completion of the acetone addition. This was controlled at, or slightly below, the reflux point by occasional cooling. When no further sign of an exothermic reaction was evident, the solution was heated and stirred at reflux. A progressive thickening was observed in the solution which remained completely clear and colorless at all times. During the reaction, samples of the solution were removed, dissolved in methyl alcohol and titrated with base to determine acid values on the solution. A gradual decrease in acidity was observed for the solution. A sample of the final polymer was isolated by evaporation of a portion of the solution to dryness. The polymeric solid was powdered and further held under a vacuum of less than 1 mm. for 20 hours to ensure removal of volatile materials. A number average molecular weight of 12,000 was found for the sample of product thus isolated.

(I) 67.5 parts of (A) was mixed with 12.5 parts of poly(isopropylidene β-chloroethyl phosphonate), 5.0 parts of methacrylic acid and 15.0 parts of cyclohexyl methacrylate monomer. The same batch of poly(isopropylidene β-chloroethyl phosphonate) was used as in mix (H).

The above mixes (A) through (I) were polymerized between glass plates by methods well known in the art. After polymerization was complete, the glass plates were removed and the clear cast sheets tested for physical properties.

Pieces of the clear cast sheets were flame tested by a method similar to ASTM 635–56T. The results of the tests are recorded in Table I below:

TABLE I.—BURNING PROPERTIES OF CAST SHEET

| Sample: | Burning | Rate (Average Inches/Minute) |
|---|---|---|
| A | Burned [1] | 1.10 |
| B | Burned | 0.57 |
| C | Self-extinguishing [2] | 0.20 |
| D | Non-burning [3] | ---- |
| E | Burned | 0.53 |
| F | Self-extinguishing | 0.13 |
| G | Non-burning | ---- |
| H | Self-extinguishing | 0.20 |
| I | Non-burning | ---- |

[1] Burned, indicates that the sample was entirely consumed over the defined area.
[2] Self-extinguishing, indicates that the sample burned when ignited but extinguished itself within the defined area.
[3] Non-burning, indicates that the sample didn't burn into the defined area.

Example 2

Pieces of cast sheet about 5″ x 5″ x ⅛″ from (A), (B), (C), (D), (H) and (I) in Example 1 were heated in an oven at 150° C. for 30 minutes. The sheets were immediately vacuum formed into a 3-inch Buchner funnel. In Table II below, the volume of water necessary to fill the formed cavities is shown. The greater the volume of water, the more formable the sheet.

TABLE II.—VACUUM FORMED CAST SHEET (AT 150° C.)

| Sample: | Volume of Water | Percent Cyclohexyl Methacrylate in Cast Sheet |
|---|---|---|
| Example 1–A | 100 milliliters | 0 |
| Example 1–B | 105 milliliters | 0 |
| Example 1–C | 155 milliliters | 15 |
| Example 1–D | 175 milliliters | 30 |
| Example 1–H | 120 milliliters | 0 |
| Example 1–I | 160 milliliters | 15 |

Example 3

72.5 parts of (A) from Example 1 was mixed with 12.5 parts of Phosgard C–22–R and 15.0 parts of cyclohexyl acrylate monomer. The mix was cast between glass plates. A clear cast sheet having good flame resistant and vacuum forming properties was obtained.

I claim:

1. As an article of manufacture, an acrylic sheet comprising:
   (I) 50 to 90% by weight methyl methacrylate,
   (II) 5 to 30% by weight of a member selected from the group consisting of cyclohexyl acrylate and cyclohexyl methacrylate,
   (III) up to 5% by weight of a modifying acrylic compound chosen from the group consisting of acrylic acid, methacrylic acid, glycidyl and lower alkyl esters of acrylic and methacrylic acid wherein the alkyl group contains one to four carbon atoms, and
   (IV) 5 to 15% by weight of a flame resistant polymeric phosphorus compound, said sheet comprising a copolymer of components I, II, and III polymerized with or in admixture with component IV.

2. An acrylic sheet according to claim 1 wherein component I is employed in the range of about 55 to 85%, and component IV is employed in the range of about 10 to 15%.

3. An acrylic sheet according to claim 1 wherein component I is employed in the range of about 57 to 83%, and component IV is employed in the range of about 12 to 13%.

4. An acrylic sheet according to claim 1 wherein component I is employed in the range of about 50 to 85%, and component IV is employed in the range of about 10 to 15%.

5. An acrylic sheet according to claim 1 wherein component IV is an addition phosphonate polymer characterized by the repeating unit:

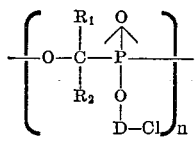

in which $n$ is an integer of 2 to about 10,000,
D is a member from the class consisting of alkylene of 2 to 3 carbon atoms and alkyl-substituted alkylene wherein the alkylene contains 2 to 3 carbon atoms and the alkyl substitution totals up to 8 carbon atoms,
$R_1$ and $R_2$, taken individually, each contain up to 12 carbon atoms and are members from the class consisting of alkyl, phenyl, phenylalkyl, alkylphenyl, alkenyl and alkoxycarbonyl, and
$R_1$ and $R_2$, taken collectively with the carbon atom to which they are attached, form a member from the class consisting of saturated and monounsaturated aliphatic rings of 5 to 7 carbon atoms, said $R_2$ having the structure $$-\overset{|}{C}H$$

6. An acrylic sheet according to claim 4 wherein III the modifying acrylic compound is chosen from the group consisting of methacrylic acid, acrylic acid and ethyl acrylate.

References Cited
UNITED STATES PATENTS

| | | | |
|---|---|---|---|
| 2,473,544 | 6/1949 | Rehberg et al. | 260—86.1 |
| 2,882,261 | 4/1959 | Marks | 260—86.1 |
| 3,014,956 | 12/1961 | Birum | 260—461 |
| 3,267,179 | 8/1966 | Russell et al. | 260—899 |
| 2,120,006 | 6/1938 | Straim | 260—86.1 |

OTHER REFERENCES

Monsanto Chemical Co., Trade Bulletin, Phosgard C–22–R, August 1965, pages 1, 6 and 7.

SAMUEL H. BLECH, Primary Examiner

JOHN T. GOOLKASIAN, Assistant Examiner

U.S. Cl. X.R.

260—45.7, 874, 89.5, 86.1, 63, 931, 80.81, 885, 80.8, 830, 80.72